TELEPHONE SIGNALING APPARATUS

Filed Oct. 14, 1957

3 Sheets-Sheet 1

INVENTOR
L. A. MEACHAM
BY A. M. Hassell
ATTORNEY

May 30, 1961 L. A. MEACHAM 2,986,603

TELEPHONE SIGNALING APPARATUS

Filed Oct. 14, 1957 3 Sheets-Sheet 2

INVENTOR
L. A. MEACHAM
BY A. M. Hassell
ATTORNEY

May 30, 1961 L. A. MEACHAM 2,986,603

TELEPHONE SIGNALING APPARATUS

Filed Oct. 14, 1957 3 Sheets-Sheet 3

INVENTOR
L. A. MEACHAM
BY A. M. Hassell
ATTORNEY

United States Patent Office 2,986,603

Patented May 30, 1961

2,986,603

TELEPHONE SIGNALING APPARATUS

Larned A. Meacham, New Providence, N.J., assignor to Bell Telephone Laboratories, Incorporated, New York, N.Y., a corporation of New York Filed Oct. 14, 1957, Ser. No. 689,908

4 Claims. (Cl. 179—17)

Figure 1:
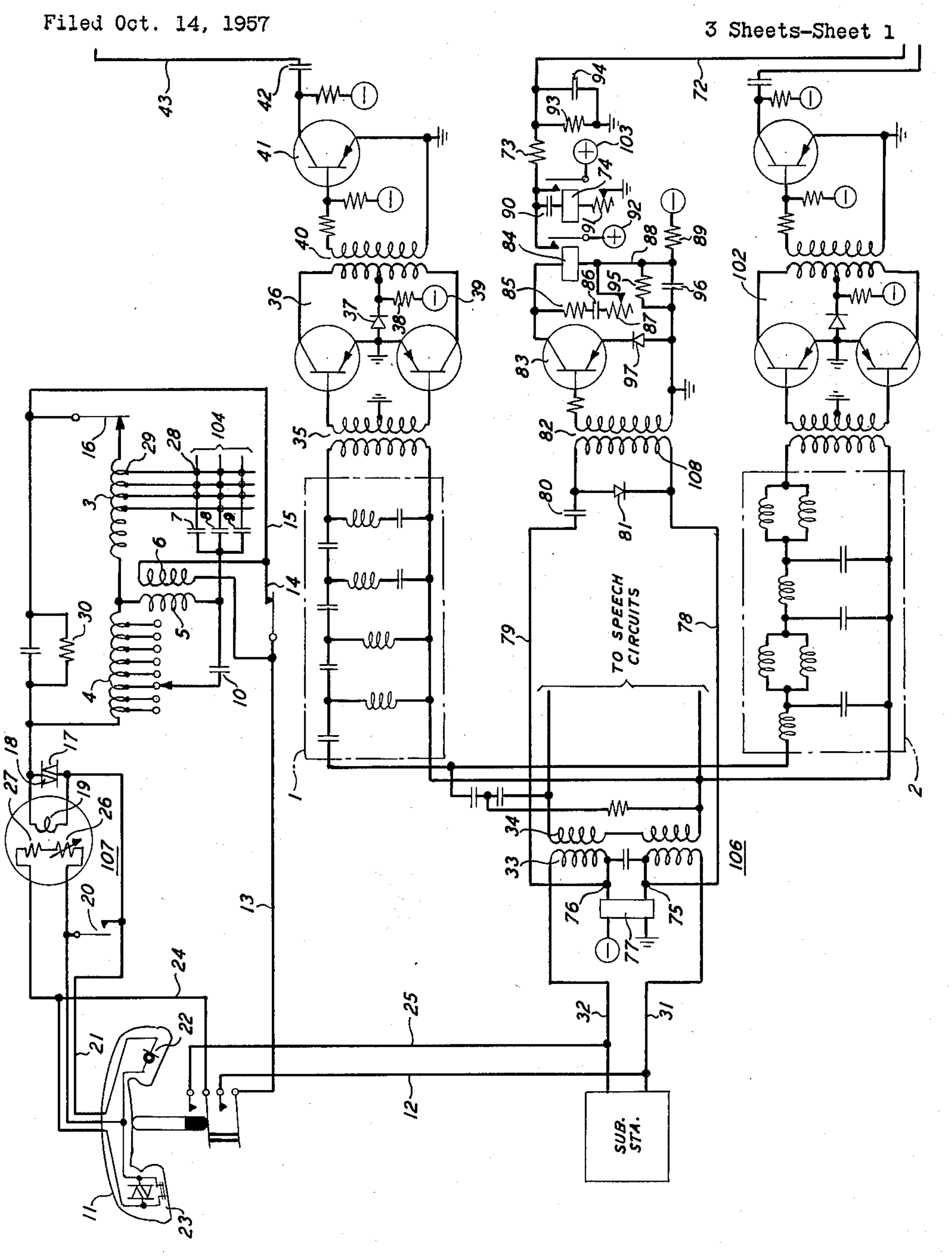

This invention relates to telephone systems and more particularly to such systems in which each dialed digit is transmitted from a customer's telephone set to the associated central office in the form of an oscillatory pulse or discharge of distinctive frequency.

A variety of systems in which voltages of different frequencies constitute information-representing signals have heretofore been proposed. However, in such systems there has arisen the problem of distinguishing between bona fide signals and those of a spurious nature which may have been induced in the signaling conductors as a result of induction, transients, or other unavoidable phenomena. Accordingly, in such systems various techniques have been employed to distinguish between those signals which are bona fide and those which are not. One such technique has involved measuring total signal power and comparing this power to the power contained in a very narrow slot of frequencies since, if the total power approximates the power of the narrow slot, the likelihood is that the narrow slot frequency signal is genuine.

Other techniques have involved the employment of characteristic advance signals which establish bona fide identity of a concurrent or immediately following information-representing signal.

Still other techniques have involved the time spacing of signals in such manner that unless the information-representing signals are received in critical time sequence, the signals are deemed spurious and are rejected.

One disadvantage which has arisen in connection with the aforementioned systems is that they are only "statistically" (as opposed to directly) reliable in their identification of the information-representing signals. Thus, for example, such systems have been designed to take advantage of the relatively remote possibility that a spurious signal will have a predetermined characteristic, and the likelihood that such signal will have that characteristic has been an inverse measure of the accuracy with which received information is processed.

In order to provide a high degree of reliability, it has been requisite in such systems that signals to which the receiving apparatus responds shall be of such nature that the likelihood of duplication thereof by a spurious signal be remote. It has therefore been necessary that such receiving apparatus be carefully designed according to closely controlled tolerances.

The subject-matter of this invention contemplates the provision of signal transmitting and receiving apparatus which is relatively simple and which advantageously overcomes the problems presented by the aforementioned statistical type of signal identification.

Accordingly, it is an object of this invention to provide a directly reliable means of signal identification whereby a signal may be accurately and dependably identified.

In accordance with one feature of this invention, in a system in which a customer generates voice-frequency representations of dialed digits by depressing suitable ones of a plurality of keys mounted upon a telephone set, the depression of each key is additionally effective to reduce the direct current flowing in the line by a predetermined amount, thereby providing a digit identification (i.e., enabling) signal.

In accordance with yet another feature of this invention, apparatus responsive to the aforementioned decrease in line current is provided at the central office and is enabled after the recognition of such decrease for a predetermined interval of brief duration only. During this brief interval of time, the information-representing-signal receiving apparatus is enabled to respond effectively to signals received. At all other times it is unresponsive.

Other objects and features of this invention will be apparent from the following detailed description, by way of example, with reference to the drawing in which the figures schematically depict circuits which I have devised in accordance with the principles underlying the invention.

Figure 2:
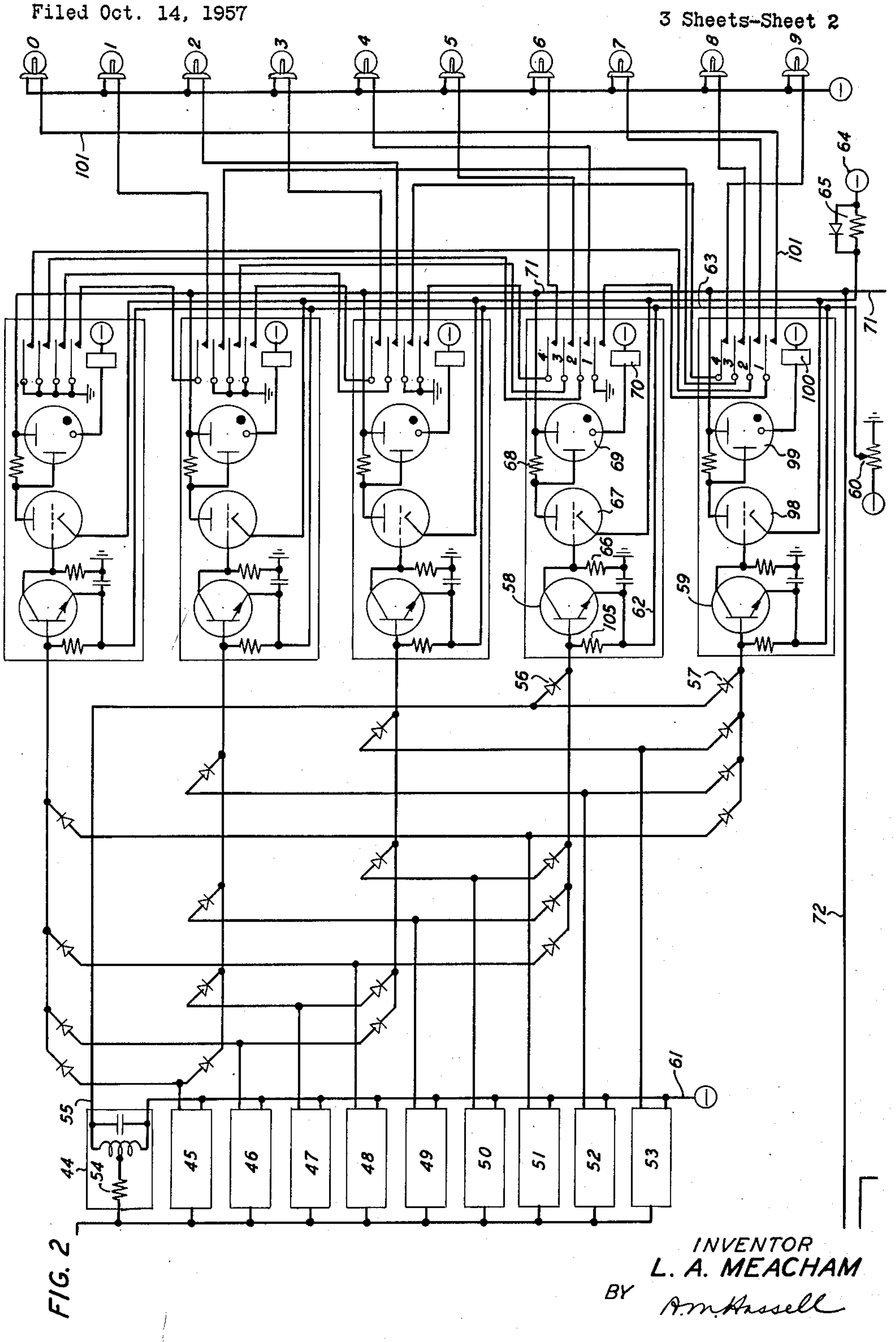
Figure 3:
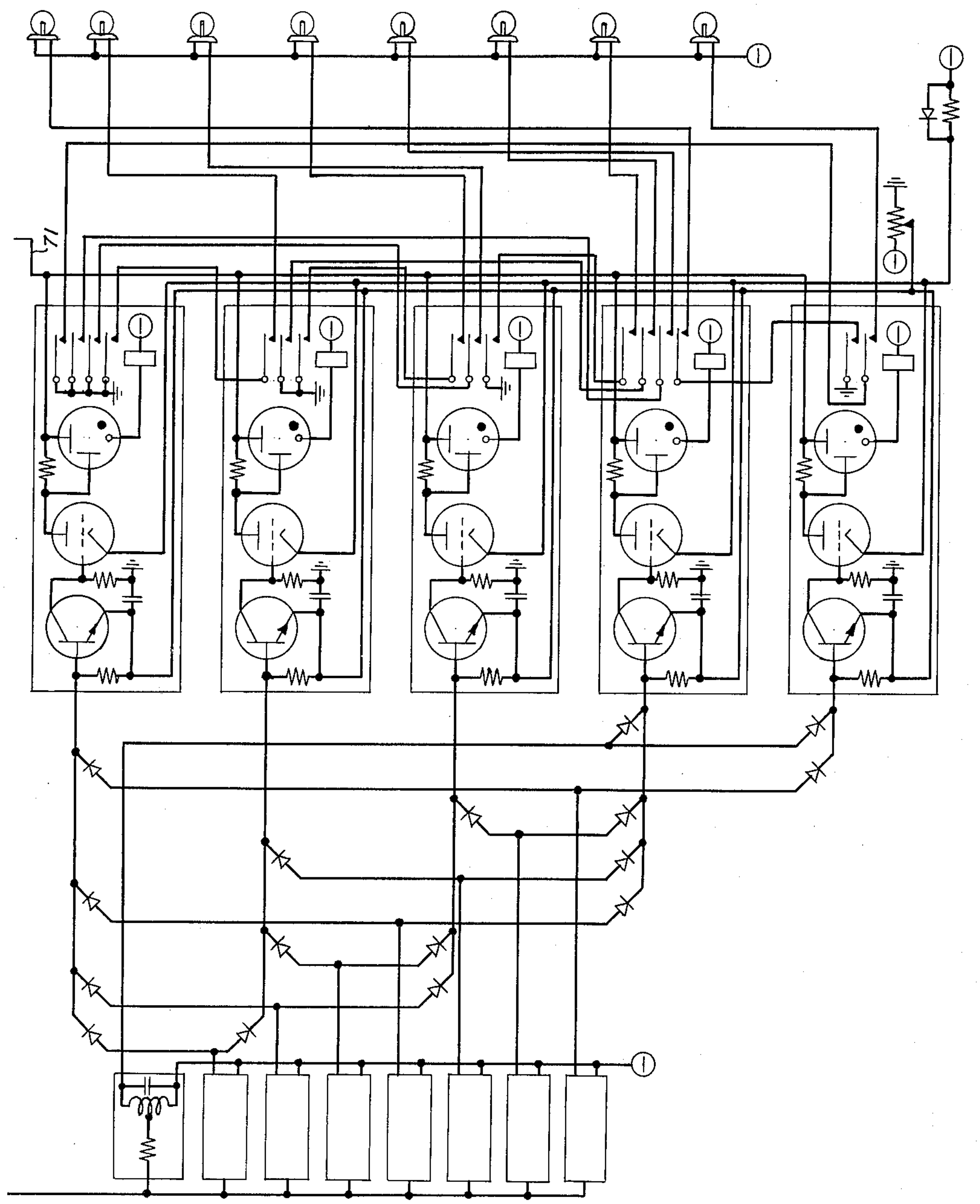

In order for the various sheets of the drawing to be properly oriented each with respect to the others, Fig. 2 should be placed immediately to the right and alongside Fig. 1, and Fig. 3 should be placed immediately below Fig. 2.

In brief, the principles of operation underlying this apparatus are as follows:

Instead of the conventional dial, each customer's telephone set is provided with a plurality of keys, one for each of the digits 0 through 9. In accordance with currently adopted telephone practice, each of the eight keys 2–9 represents three letters of the alphabet in addition to the indicated digit, and key 0 additionally represents the letter Z. In order to "dial" a given digit or letter, it is necessary only to depress the desired key in the abovementioned telephone set to generate a corresponding information-representing signal. Key-type telephone sets have been heretofore proposed, illustrative of which is the set described in my Patent No. 2,824,173 granted February 18, 1958.

Whereas in the conventional telephone subset the dial generates one or more direct-current pulses representing the dialed information, in the herein-considered set each key, when depressed, is effective to produce two or three electrical conditions as follows:

The first of these conditions, which is a stepwise reduction in direct-current flow over the line, is known as the enabling signal;

The second is an oscillatory pulse or discharge of distinctive frequency, the frequency being the particular one of ten frequencies which represents the "dialled" digit;

The third may or may not be present, depending upon whether or not station (or party) identification is to be made. If the feature of station identification is included, the third electrical condition is yet another oscillatory discharge of distinctive frequency, said frequency representing the identity of the actuated telephone set.

Thus, for example, each set may have ten keys numbered with appropriate letters and numerals and, although the depression of any one of these keys will result in an identical reduction in line loop current and, for a given set in the generation of an identical party identification frequency oscillatory discharge, each key when depressed will generate a distinctive signal which represents the "dialled" digit or letter.

Where party line identification is desired, a cut-apart filter is provided at the central office to direct signals of those frequencies which represent dialed digits into one channel and the party identification frequency signals into another channel. The digit information channel conveys digit signals to ten tuned circuits, each tuned to a different one of the ten digit-representing frequencies, and the party identification channel conveys party identification signals to a plurality of somewhat similar tuned circuits, each tuned to a different one of the party identification frequencies.

Signals passed by these tuned circuits are conveyed through suitable translating matrices to unique limiting amplifiers and thence to gas tube-relay indicators or, where such equipment is to be included in telephone switching systems, to digit registers and calling party identification information utilization apparatus.

The enabling signal, i.e., the step-wise reduction in direct current that enables each alternating oscillatory discharge signal, is conveyed to an enabling circuit which applies direct-current operating potentials to (or otherwise enables) the gas tube-relay indicators (or other information utilization apparatus) only during a brief interval subsequent to the current reduction. Thus, the gas tube-relay indicators are rendered capable of responding to a digit- and party-representing signal only during the brief period of enablement following the step-wise reduction of line direct-current flow.

Now turning to the drawing, it will be noted that there is therein depicted a subscriber's telephone set 11 in partial schematic form together with a representation of another similar set. These two sets are bridged across a common line which is connected to a conventional repeating coil 106. The secondary windings of said coil are connected to conductors which extend the talking path to speech circuits (not shown) and, in addition, are connected to filters 1 and 2 which serve to channel signals of different frequencies in the manner hereinabove indicated.

The telephone handset 11 is of the conventional type and may, for example, be that which commonly forms a part of the Western Electric Company type 500 telephone. For purposes of clarity and simplicity, only those circuit elements necessary to describe operation of the present invention are shown, the remaining elements within the aforementioned type 500 telephone being understood to operate in the conventional manner.

The dial of the telephone has been removed and in place thereof there are ten pushbutton-type keys, the contacts of which are interconnected with inductors 3 and 4, coupling transformer primary winding 5, and capacitors 7, 8, 9 and 10 to form a multifrequency signal generating network.

Certain of the telephone switchhook contacts are shown and serve to complete paths from the line to the talking and signaling circuits in the conventional manner. Thus, for example, when the telephone set 11 is removed from its cradle, a path is extended from conductor 12 over the lower switchhook contacts and thence over conductor 13, contacts 14 which are normally closed auxiliary contacts associated with each of the pushbutton keys, and conductor 15 to contacts 16 which are also normally closed auxiliary contacts associated with each of the pushbutton keys. From contacts 16, the path is continued through inductor 3, inductor 4, and the automatic transmission equalizer 107. This element comprises a pair of oppositely poled diodes 17 and 18 shunted by filament 19. The path then extends to conductor 21 and the telephone transmitter 22 which are shunted by pushbutton key auxiliary contacts 20, the telephone receiver 23, conductor 24, the upper switchhook contacts, and conductor 25.

Bridged across the telephone set receiver are attenuating elements 26 and 27 of the automatic transmission equalizer 107 which are conventional to certain models of the aforementioned type 500 set, and serve to automatically compensate for the length of conductors which connect a given subset to the central office. Other models of the type 500 set utilize somewhat different transmission equalizers. One example of such different equalizers is described on pages 611–626 of The Bell System Technical Journal for May, 1953.

As mentioned above, sets of contacts 14, 16, and 20 are all auxiliary to each of the pushbutton keys, and therefore when any one of the pushbutton keys is depressed, these three sets of contacts operate according to the sequence hereinafter set forth.

As any one of the pushbuttons is depressed, a related one of the crosspoints 104 is closed, thereby connecting the selected tap of inductor 3 with the selected one of capacitors 7, 8, and 9. Almost immediately thereafter, contact pair 20 closes and contact pair 14 opens, thereby short-circuiting the transmitter and introducing the secondary winding 6 of the coupling transformer serially into the line loop. Contacts 16 then open, thereby interrupting the flow of current from the line through inductors 3 and 4.

As mentioned before, each key when depressed is effective to produce a signal of two frequencies one of which represents the "dialed" digit and the other the identity of the initiating subset. In addition, the line current is decreased to a predetermined value.

The signals of different frequencies are generated by the oscillatory discharge of energy contained in the magnetic fields of the inductors 3, 4 into the associated capacitors 7, 8, 9 when contacts 16 are opened.

As mentioned above, when a key is depressed, a path is extended from one of the taps of inductor 3 to one of the capacitors. Thus, for example if key 28 is depressed, a path is extended from tap 29 of inductor 3, through the key contacts and thence to the right-hand terminal of capacitor 7. Because the resistance of resistor 30 is relatively high with respect to the resistance of serially connected inductors 3 and 4, the major part of the line current ordinarily flows through the inductors and, when contacts 16 are opened, energy stored in the magnetic fields of the inductors attempts to maintain the current flow. Current is diverted into the associated capacitors and thereafter flows in an oscillatory manner around the loop. Thus in the selected example, oscillatory current flows around the loop comprising capacitor 7, the primary winding 5 of the coupling transformer, inductor 3 and selected key 28, thereby initiating a digit-representing oscillatory discharge. Similarly, current flows around the loop comprising inductor 4, capacitor 10, and the primary winding 5 of the transformer, thus initiating a party-representing oscillatory discharge.

The connected tap of inductor 4 is different at each station on a given party line in order to provide a different frequency for each station connected thereto. Eight taps are shown in order to provide eight party-identification frequencies. However, more or less than this number may be provided according to the number of parties that are to be identified.

As the oscillatory discharge currents flow in the primary winding 5 of the coupling transformer, corresponding currents are induced in the secondary winding 6 and are conducted over the path hereinbefore traced to conductors 12 and 25, whence they flow over conductors 31 and 32 to the primary windings 33 of the repeating coil 106. Corresponding currents of identical frequencies are induced in the secondary windings 34 and are conducted over the obvious paths to the input terminals of filters 1 and 2.

At the same time that the party- and digit-representing signals are being generated, the line current is decreased to a predetermined level. When the pushbutton auxiliary contacts 16 open, the relatively low impedance path shunting the resistor 30, i.e., inductors 3 and 4, is broken. The entire line current must then flow through resistor 30, and the magnitude thereof is therefore substantially decreased. This decrease in current manifests itself at the right-hand terminals 75 and 76 of line supervisory relay 77 in the form of a change in potential difference due to the change in voltage drop across the relay 77 windings. The decreased current is still of sufficient magnitude to hold operated the supervisory relay 77 thereby avoiding the possibility of an undesired response by the central office equipment.

The potentials at terminals 75 and 76 are conducted over leads 78 and 79 to a differentiating network which comprises capacitor 80 and the impedance presented by the primary of transformer 82 in parallel with the back resistance of asymmetrical current device 81. The momentary pulse output of this network is effectively passed through coupling transformer 82 to transistor 83.

Transistor 83 acts as a switch and, under the influence of the pulse, draws a heavy current. This current flows from the collector through a parallel circuit of which one leg comprises the coil of relay 84 and the other leg comprises resistor 85, capacitor 86, and adjustable resistor 87. The current then flows over conductor 88 and through resistor 89 to battery.

As hereinbefore mentioned, the "dialed" information is represented by oscillatory discharges of distinctive frequency. Since unwanted transients or other interference may be present during the first few cycles, for example as a result of speech energy transmitted just before operation of a pushbutton, it is desired to delay enablement of the signal receiving equipment until after several cycles have passed. However, it is not desired to inordinately delay enablement because the amplitude of the bona fide oscillatory discharge signals drop rapidly. The aforementioned leg of resistor 85, capacitor 86, and variable resistor 87 is provided to afford means for adjustably delaying operation of relay 84 in order to prevent it from operating until a predetermined interval has expired subsequent to the switching of transistor 83. As mentioned above, this time interval may advantageously approximate the time required for several cycles of the information-representing signal to pass.

When transistor 83 is activated by the aforementioned pulse, the major share of its initial collector current flows through capacitor 86. However, as the charge on capacitor 86 increases, an increasingly greater part of the transistor collector current flows through the operating coil of relay 84 until it reaches a magnitude at which the relay contacts are sufficiently attracted to operate. In response to this operation, a path is extended from positive battery 92 over the contacts of relay 84 and thence to the upper terminal of capacitor 90. Charging current flows to capacitor 90 over this path and in response thereto a corresponding current flows from its lower terminal through the operating coil of relay 74 and adjustable resistor 91 to ground, thereby operating relay 74 and connecting the upper terminal of capacitor 90 to positive battery 103 over the obvious path.

As mentioned before, the pulse which is emitted by the differentiating network of capacitor 80 and parallel-connected asymmetrical device 81 and primary winding 108 of transformer 82 is of brief duration. Therefore, transistor switch 83 is turned on during a brief interval only. Since a substantial portion of this interval occurs during the aforementioned time delay, relay 84 is operated only momentarily, but the locking circuit ensures a continued connection of positive battery to the upper terminal of capacitor 90 until the decrease in charging current therethrough reaches a point at which operation of relay 74 will no longer be sustained.

Resistor 95 is included in order to provide required bias, and capacitor 96 serves to by-pass alternating-current components. The diode 97 prevents the transistor from being turned on by a signal at the base thereof unless such signal is greater in magnitude than the forward conducting bias of the diode, thus preventing activation of the transistor by unwanted transients, line clicks, etc.

The interval of time during which relay 74 is operated depends upon the value of capacitor 90 together with the remaining circuit parameters, and this time should be of sufficient duration to allow the hereinafter described signal-responsive apparatus to respond effectively, but should not be of sufficient duration to retain the signal-responsive apparatus in an activated condition subsequent to the release of one of the telephone subset pushbuttons.

During the interval that relay 74 is energized, a path is extended from battery 103 over the contacts of relay 74, and thence through resistor 73 and conductor 72 to triode and gas tube circuits which are more fully explained below. Resistor 73 together with capacitor 94 and resistor 93 are provided in order to decouple the triode and gas tube circuits from capacitor 90 and its associated circuit elements, thereby to eliminate any undesired interaction which might result from transients which occur when the gas tubes fire.

Now returning to the circuits for receiving the information-representing oscillatory discharge signals, it should be noted that filter 1 may be of the high-pass type with low frequency cut-off at a point lower than the lowest digit identification frequency, and filter 2 may be preferably a band-pass filter tuned to pass the band in which the party-identification frequencies lie.

Party identification and digit-representing frequencies are separated by these filters and are selectively impressed upon push-pull transistor limiting amplifiers 36 and 102, respectively. Thus, for example, a digit-representing signal component is passed by filter 1 and transformer 35 to limiting amplifier 36. This amplifier is of the conventional common emitter type and is prevented from amplifying the impressed signals beyond a level corresponding to the forward conducting voltage drop across diode 37. The voltage drop across this diode may be of the order of one volt, for example, although the magnitude thereof is not critical. Actually, the diode could be eliminated together with resistor 38 if the negative source of potential 39 were stable and of the order of one or two volts.

Because the oscillatory discharge signal has a decaying characteristic and therefore decreases in magnitude with time, push-pull limiting amplifier 36 is included to provide an output signal of substantially constant amplitude so long as the magnitude of the oscillatory discharge signal is equal to or above the limiting level.

A circuit of push-pull design is used because a larger percentage of output power will be concentrated at the fundamental frequency than if the amplifier were single-sided. However, it should be understood that a single-sided amplifier could be used and could be arranged readily to operate satisfactorily.

The output signal from limiting amplifier 36 is conveyed through transformer 40 and is impressed upon the base of transistor 41. Transistor 41 is connected in the conventional grounded emitter configuration and serves to amplify the signal in the well-known manner. After amplification, the signal is conducted through capacitor 42 and thence over conductor 43 to the input terminals of tuned anti-resonant circuits 44–53. These circuits are selectively tuned one to each of the different digit-identification frequencies. Therefore in the presence of a signal, a substantial voltage will be developed across only that anti-resonant circuit which is tuned to the signal frequency.

The anti-resonant circuit input resistor 54 is provided in order to prevent the remaining circuits from acting as a low impedance short on the common input lead, in order to provide a means for equalizing tuned circuit output voltages through the independent selection of resistor values, and in order to give the source driving the tuned circuit a simulated characteristic of a high impedance constant-current source.

Signals of different digit-identification frequencies are thus selectively channeled and led to a following diode translating matrix which is effective to translate the signals from the code in which they are expressed, for example, a one-out-of-ten code into the well-known two-out-of-five code. Thus, for example, if the digit 0-representing signal is received, it will be applied to conductor 43 and, although it will be impressed upon the input terminals of all the anti-resonant circuits 44–53, it will be effectively passed only by circuit 44. Therefore, of the diode matrix input leads, only the lead 55 will be activated. The signal will be conducted over this lead to diodes 56 and 57 which are effective to rectify it and impress the resulting half wave currents on the base elements of transistors 58 and 59.

Transistors 58 and 59 are connected to form especially advantageous limiters which limit the amplitudes of the signal voltages in the tuned circuits without substantially altering either sinusoidal form or positive and negative symmetry. These advantageous characteristics result from the arrangement of circuit parameters and the conditions under which the transistors operate.

Considering transistor 58, for example, it will be noted that a potential may be conducted thereto over two paths. The first of these includes conductor 61, conductor 55, and diode 56. The other includes adjustable resistor 60, conductor 63, conductor 62, and resistor 105. Since conductor 61 is connected to negative battery, and since conductor 63 is connected to a source of potential somewhat less negative, i.e., the voltage divider tap on resistor 60, diode 56 is normally back-biased and the base of transistor 58 normally rests at emitter potential.

Because the base is thus biased, when there is no signal, the transistor is in its high impedance condition and collector current is small. However, when the tuned circuit voltage rises in magnitude to the point at which the base is driven positive with respect to the emitter, i.e., if the amplitude across the tuned circuit becomes greater than the aforementioned bias voltage plus the voltage drop of the series diode 56 and the emitter diode, the tuned circuit at the peak of its positive half cycle looks into a relatively low impedance. Thus as the voltage across the tuned circuit rises, the impedance of the transistor remains at a relatively stable high magnitude until the point is reached at which the base is driven positive with respect to the emitter into the region of transistor conduction. At that time, the transistor changes from its high impedance state to a low impedance state. Since the tuned circuit receives its driving voltage from a source of high impedance (resistor 54), the lowered transistor impedance is effective to limit the amplitude of the tuned circuit voltage to a value only slightly greater than that at which transistor conduction begins.

The above-described control hastens the termination of conduction of the transistor when the energizing signal ceases, as for example when the tuned circuit has been falsely energized by speech just prior to operation of a pushbutton (which disables the speech transmitter to interrupt any such interference). It is evident that false registration might occur if such conduction were to persist until the gas tubes were enabled as heretofore mentioned.

Connected to each transistor limiter, there is a triode which is effective to control the firing of the gas tube to which it is also connected. Normally, the triode conducts heavily because the grid thereof is maintained at a potential substantially positive with respect to the cathode. This will be apparent from an inspection of the cathode and the grid of triode 67 which are connected respectively to source of negative potential 64 through voltage reducing network 65 and to ground through resistor 66. Since the grid is positive with respect to the cathode, substantial grid current is drawn and a correspondingly substantial current is drawn by the plate. This latter current, i.e., plate current, flowing through resistor 68, is sufficient to drop the voltage at the starting electrode of gas tube 69 to a magnitude less than that required to fire it.

However, when the voltage across the tuned circuit exceeds the limiting level, and the transistor impedance is greatly reduced as mentioned above, current flows from ground through resistor 66 into the collector of transistor 58, thereby driving the grid of tube 67 negative and interrupting the flow of current from the plate to the cathode. As a result, the voltage drop across resistor 68 is substantially decreased, and the starting electrode voltage correspondingly rises to a point sufficient to fire the gas tube.

When gas tube 69 fires, it completes a path for the operation of relay 70 from negative battery through the relay, across the gas tube, and thence over conductor 71, conductor 72, resistor 73 and the normally open contacts of relay 74 (when operated) to source of positive potential 103.

As mentioned before, relay 74 is the bona fide signal identification relay which is operated for a brief interval after the recognition of the aforementioned decrease in line current.

It will now be apparent that although any one of the tuned circuits will respond to the receipt of an alternating-current signal of proper frequency, none of the triode gas-tube circuits will effectively respond unless the alternating-current signal is accompanied by the aforementioned stepped reduction in line current, for no operating voltage will be available to the triodes and gas tubes except during a brief interval of time following the reduction of line current.

As has been described, the diodes which interconnect the tuned circuits with the amplitude controlling transistors and associated triode gas-tube pairs are connected to form a translating matrix in which the "dialed" information is translated from a one-out-of-ten to a two-out-of-five code by way of example. Thus, for instance, if a signal of digit 0 frequency is received, the tuned circuit 44 will be excited and translation is effected into the well-known two-out-of-five code by the activation of transistors 58 and 59 through matrix diodes 56 and 57.

It will be noted that in the drawing each amplitude-controlling transistor, its associated triode gas-tube pair, and a connected relay are enclosed within a rectangle. Each rectangle is identified in the upper left-hand corner with the two-out-of-five code element which it represents.

As is well known in the art, the two-out-of-five code contains five elements which, in pairs, represent corresponding elements expressed in a decimal code. According to standard practice, the decimal digit 0 is represented by two-out-of-five-code elements 4 and 7, digit 1 by elements 0 and 1, digit 2 by elements 0 and 2, digit 3 by elements 1 and 2, digit 4 by elements 0 and 4 and so on. It will be noted that each of the ten tuned circuits is connected to the corresponding two of the five circuits which are enclosed in the rectangles. Thus, when one of the ten tuned circuits is activated, the corresponding two limiting transistors and associated gas tubes and relays are also activated.

In some types of switching systems the registration may be used directly in this two-out-of-five form. For other types, retranslation to the one-out-of-ten code may be desired, possibly including a visual indication of the dialed digit. Such retranslation may be accomplished by means of the five relays which are severally associated with the gas tubes, and a visual indication of the dialed digit may be provided by illuminating the selected one of ten indicating lamps. Thus, for example, when a bona fide signal representing the digit 0 is received, tuned circuit 44 is activated together with transistors 58 and 59. As hereinbefore described, the associated triodes and gas tubes operate, and when gas tubes 69 and 99 operate, paths are completed for the operation of relays 70 and 100 as previously explained for relays 70 only. In response to the operation of these two relays, a circuit is completed for the energization of indicating lamp 0 from ground over the No. 1 front contacts of relay 70, the No. 1 front contacts of relay 100, and conductor 101 to the lower terminal of indicating lamp 0. Since the the remaining terminal of this indicating light is connected to negative battery, the lamp will light in this circuit.

Where the decimal code is required, the above-described translation and retranslation actually minimizes the number of circuit elements required, the number of amplitude-controlling transistors, triodes, gas tubes, and relays being thereby reduced from ten to five.

Party-identification circuits operate in a manner similar to those hereinabove described for digit identification. Although in the illustrative embodiment herein set forth eight party-identification frequencies may be employed, five limiting transistor-triode-gas-tube circuits are shown. It will be obvious from an inspection of the circuits that the code points 8 and 9 are not utilized, although they could be readily added in a manner similar to that depicted in the digit-representing circuits.

Although I have illustrated my invention by one particular illustrative embodiment thereof, the invention is not limited in its application to the specific apparatus and particular arrangement therein disclosed. Various applications, modifications, and arrangements of the invention will readily occur to those skilled in the art.

What is claimed is:

1. In a telephone system, the combination comprising a party line; a plurality of subscribers station sets connected to said line; a plurality of keys mounted on each station set, each of the keys on a given station set being representative of a different one of a plurality of digits and each being effective when depressed to generate a signal having an enabling component and an information-representing component, said information-representing component being selected from among a predetermined group of frequencies and being representative of the digit to which the depressed key appertains; a plurality of tuned circuits, each having an input circuit including a relatively high impedance; said plurality of tuned circuits being selectively tuned to the frequencies of said predetermined group of frequencies; filter means for channeling each said information-representing component to said plurality of tuned circuits; a plurality of variable impedance devices, less in number than the number of said plurality of tuned circuits; gating means interconnecting said plurality of tuned circuits with said plurality of variable impedance devices, all of said variable impedance devices having a substantially constant high impedance at voltages lying within the range of zero to a value slightly less than the magnitude of a predetermined voltage, a relatively gradually diminishing impedance over a range lying between a value slightly less and a value slightly more than said predetermined voltage, and a relatively low impedance at voltages in excess of said predetermined voltage; a plurality of visual indicators; normally disabled connecting means for selectively interconnecting said visual indicators with said variable impedance devices; enabling means, including a transistor connected to said line, responsive to the receipt of said enabling component for producing a momentary pulse; a first relay having a pair of contacts; timing means, including a capacitor and a resistor interconnecting said first relay with said transistor, responsive to the receipt of said pulse for activating said first relay momentarily a predetermined interval subsequent to the receipt of said pulse, a second relay; means, interconnecting said first relay with said second relay, responsive to the operation of said first relay for operating said second relay only during a brief period of time subsequent to the operation of said first relay; and means, including a pair of contacts of said second relay, effective only when said second relay is operated for supplying an enabling potential to said normally disabled connecting means.

2. In a telephone system, the combination comprising a party line; a plurality of subscribers station sets connected to said line; a plurality of keys mounted on each station set, each of the keys on a given station set being representative of a different decimal digit and each being effective when depressed to generate a signal having a direct current enabling component and an alternating current information-representing component, said alternating current component being selected from among a predetermined group of frequencies and being representative of the identity of the station set at which the key is depressed; a plurality of tuned circuits each having an input circuit including a relatively high impedance, said plurality of tuned circuits being selectively tuned to the frequencies of said predetermined group of frequencies; filter means for channeling said alternating current component to said plurality of tuned circuits; a plurality of variable impedance devices less in number than the number of said plurality of tuned circuits; a translating matrix interconnecting said plurality of tuned circuits with said plurality of variable impedance devices, all of said variable impedance devices having a substantially constant high impedance at voltages lying within the range of zero to a value slightly less than the magnitude of a predetermined voltage, a relatively gradually diminishing impedance over a range lying between a value slightly less and a value slightly more than said predetermined voltage, and a relatively low impedance at voltages in excess of said predetermined voltage; a plurality of normally disabled translating devices equal in number to the number of said variable impedance devices; means selectively interconnecting said translating devices with said variable impedance devices; a plurality of visual indicators equal in number to the number of said tuned circuits; means for selectively interconnecting said visual indicators with said translating devices; a differentiating circuit connected to said line responsive to the receipt of said direct current enabling component for producing a momentary pulse; a transistor, connected to said differentiating circuit, responsive to the receipt of said momentary pulse for momentarily heavily conducting current between its emitter and collector; a first relay connected to the collector of said transistor, said first relay having a pair of contacts and being inherently operative in response to a heavy flow of current through said emitter-collector path of said transistor; a timing circuit, including a capacitor and a resistor connected to said collector effective when said transistor heavily conducts current for preventing said first relay from operating until after the passage of a predetermined interval of time; a circuit, including a capacitor and a second relay connected to said first relay, responsive to the operation of said first relay for operating said second relay only during a brief period of time subsequent to the operation of said first relay; and means, including a pair of contacts of said second relay, effective only when said second relay is operated for supplying an enabling potential to said translating devices.

3. In a telephone system, the combination comprising a party line; a plurality of subscribers station sets connected to said line; a plurality of keys mounted on each station set, each of the keys on a given station set being representative of a different decimal digit and each being effective when depressed to generate a signal having a direct current enabling component and an alternating current information-representing component, said alternating current component being selected from among a predetermined group of frequencies and being representative of the decimal digit to which the depressed key appertains; a plurality of tuned circuits each having an input circuit including a relatively high impedance, said plurality of tuned circuits being selectively tuned to the frequencies of said predetermined group of frequencies and being representative of the decimal digit to which the depressed key appertains; filter means for channeling said alternating current component to said plurality of tuned circuits; a plurality of variable impedance devices less in number than the number of said plurality of tuned circuits; a translating matrix interconnecting said plurality of tuned circuits with said plurality of variable impedance devices; all of said variable impedance devices having a substantially constant high impedance at voltages lying within the range of zero to a value slightly less than the magnitude of a predetermined voltage, a relatively gradually diminishing impedance over a range lying between a value slightly less and a value slightly more than said predetermined voltage, and a relatively low impedance at voltages in excess of said predetermined voltage; a plurality of normally disabled translating devices equal in number to the number of said variable impedance devices; means selectively interconnecting said translating devices with said variable impedance devices; a plurality of visual indicators equal in number to the number of said tuned circuits, means for selectively interconnecting said visual indicators with said translating devices; a differentiating circuit connected to said line responsive to the receipt of said direct current enabling component for producing a momentary pulse; a transistor connected to said differentiating circuit responsive to the receipt of said momentary pulse for momentarily heavily conducting current between its emitter and collector; a first relay connected to the collector of said transistor, said first relay having a pair of contacts and being inherently operative in response to a heavy flow of current through the emitter-collector path of said transistor; a timing circuit, including a capacitor and a resistor connected to said collector, effective when said transistor heavily conducts current for preventing said first relay from operating until after the passage of a predetermined interval of time; a circuit, including a capacitor and a second relay connected to said first relay, responsive to the operation of said first relay for operating said second relay only during a brief period of time subsequent to the operation of said first relay; and means, including a pair of contacts of said second relay, effective only when said second relay is operated for supplying an enabling potential to said translating devices.

4. In a telephone system, a party line; a plurality of subscribers station sets connected to said line; a plurality of keys mounted on each station set, each of the keys on a given station set being representative of a different decimal digit and each being effective when depressed to concurrently generate a direct current enabling signal and an information-representing signal; said information-representing signal having two alternating-current components, one of said components being selected from among a first predetermined group of frequencies and being representative of the identity of the station set at which the key is depressed, the other of said components being selected from among a second predetermined group of frequencies and being representative of the decimal digit to which the depressed key appertains; a first plurality of tuned circuits each having an input circuit including a serially-connected high impedance, said first plurality of tuned circuits being selectively tuned to the frequencies of said first predetermined group of frequencies; a second plurality of tuned circuits each having an input circuit including a serially-connected high impedance, said second plurality of tuned circuits being selectively tuned to the frequencies of said second predetermined group of frequencies; means for channeling said one of said components to said first plurality of tuned circuits and for excluding said one of said components from said second plurality of tuned circuits; means for channeling said other of said components to said second plurality of tuned circuits and for excluding said other of said components from said first plurality of tuned circuits; a first plurality of variable impedance devices less in number than the number of said first plurality of tuned circuits; a second plurality of variable impedance devices less in number than the number of said second plurality of tuned circuits; a first translating matrix interconnecting said first plurality of tuned circuits with said first plurality of variable impedance devices; a second translating matrix interconnecting said second plurality of tuned circuits with said second plurality of variable impedance devices; all of said variable impedance devices having a substantially constant high impedance at voltages lying within the range of zero to a value slightly less than the magnitude of a predetermined voltage, a relatively gradually diminishing impedance over a range lying between a value slightly less and a value slightly more than said predetermined voltage, and a relatively low impedance at voltages in excess of said predetermined voltage; a plurality of normally disabled translating devices equal in number to the number of said first and said second pluralities of said variable impedance devices; means selectively interconnecting said translating devices with said first and second pluralities of variable impedance devices; a plurality of visual indicators equal in number to the sum of said first plurality of tuned circuits and said second plurality of tuned circuits; means for selectively interconnecting said visual indicators with said translating devices; a differentiating circuit, connected to said line, responsive to the receipt of said direct current enabling signal for producing a momentary pulse; a transistor, connected to said differentiating circuit, responsive to the receipt of said momentary pulse for momentarily heavily conducting current between its emitter and collector; a first relay connected to the collector of said transistor, said first relay having a pair of contacts and being inherently operative in response to a heavy flow of current through the emitter-collector path of said transistor; a timing circuit, including a capacitor and a resistor connected to said collector, effective when said transistor heavily conducts current for preventing said first relay from operating until after the passage of a predetermined interval of time; a circuit, including a capacitor and a second relay connected to said first relay, responsive to the operation of said first relay for operating said second relay only during a brief period of time subsequent to the operation of said first relay, and means, including a pair of contacts of said second relay, effective only when said second relay is operated for supplying an enabling potential to said translating devices.

References Cited in the file of this patent

UNITED STATES PATENTS

| | | |
|---|---|---|
| 2,030,987 | Herckmans | Feb. 18, 1936 |
| 2,277,228 | Hecht | Mar. 24, 1942 |
| 2,697,749 | Jeanne | Dec. 21, 1954 |
| 2,909,609 | Svala | Oct. 20, 1959 |